United States Patent [19]

Ziv

[11] 4,293,107

[45] Oct. 6, 1981

[54] TENSION RELIEVING SELECTIVE ENGAGEMENT MECHANISM WITH MEMORY

[75] Inventor: Avraham Ziv, Sepulveda, Calif.

[73] Assignee: American Safety Equipment Corporation, San Fernando, Calif.

[21] Appl. No.: 68,944

[22] Filed: Aug. 23, 1979

[51] Int. Cl.³ .................... A62B 35/02; B65H 75/48
[52] U.S. Cl. .................... 242/107.7; 280/802
[58] Field of Search ............ 242/107.7, 107.6, 107.12; 280/803–808, 802; 297/474–480

[56] References Cited

U.S. PATENT DOCUMENTS

| 3,682,412 | 8/1972 | Kuszynski | 242/107.6 X |
| 3,834,646 | 9/1974 | Heath | 242/107.7 |
| 4,002,311 | 1/1977 | Fisher et al. | 242/107.7 |
| 4,023,746 | 5/1977 | Magyar | 242/107.7 |
| 4,040,645 | 8/1977 | Giffen et al. | 280/803 |
| 4,065,072 | 12/1977 | Magyar | 242/107.7 |
| 4,108,395 | 8/1978 | Heath | 242/107.7 |

Primary Examiner—John M. Jillions
Attorney, Agent, or Firm—Poms, Smith, Lande & Rose

[57] ABSTRACT

A selectively manually operable tension-relieving mechanism with memory is disclosed. The improved tension-relieving mechanism is nominally disengaged from the retractor spool assembly to allow frictionless operation thereof and is manually engageable. An actuator lever causes the mechanism to become engaged with a seat belt retractor by engagement of a pair of ratchet disks. A pawl and groove assembly then cause operation in a tensionless mode upon a subsequent slight belt protraction. A latch retains the actuator in an engaged condition until override by the occupant or substantial subsequent protraction. Orienting means restores the mechanism to its initial condition upon disengagement.

23 Claims, 11 Drawing Figures

Fig. 1.

TENSION RELIEVING SELECTIVE ENGAGEMENT MECHANISM WITH MEMORY

BACKGROUND OF THE INVENTION

This invention relates generally to automobile seat belt retracting systems and more specifically to the provision of an improved manually operable tension-relieving mechanism.

The invention is applicable to most common types of seat belt and retracting spool systems. It has been found in those systems including a seat belt retractor that a retractor force for windably retracting the belt about a spool applies a constant pressure upon the vehicle occupant and may result in discomfort or displeasure. It is thus desirable to have means which maintain the belt at other than a fully tensioned position against the occupant's body by maintaining the belt at a slightly protracted or slackened position granting the occupant a small degree of freedom of movement without the belt imparting force to the occupant but maintaining the belt in a proper position for providing emergency restraint.

It is further desirable to provide a system for relieving tension that may be selectively manually engaged by the occupant with relative ease and that otherwise is disengaged so as not to impart drag to rotation of the retractor spool.

It is intended that this invention be particularly applicable to otherwise passive retraction devices that lock-up in emergency conditions. These devices typically have an internal ratchet in communication with the retracting spool that is engaged by a pawl that prevents protractive rotation of the spool during emergency conditions. This pawl and spool arrangement may be of two types, the first known as "web sensitive" wherein the pawl and spool assume the lock-up condition upon a sudden protraction of the seat belt as when the occupant is suddenly thrown forward. The second type is known as "vehicle sensitive" and typically incorporates an inertia mass that acts as a pendulum to cause lock up whenever the vehicle experiences excessive acceleration or deceleration.

RELEVANT ART

Two patents exemplify the current art in the design of tension-relieving mechanisms. The first is U.S. Pat. No. 3,834,646 issued to Robert B. Heath on Sept. 10, 1974 and describes a retractor mechanism that includes a vehicle sensitive inertial lock-up and an automatic tension-relieving mechanism. The mechanism utilizes a pawl that rides on the edge of a pair of cam disks rotated by the retractor spool and arranged such that the pawl will fall into locking engagement with a spool ratchet surface upon a sequence of belt protraction, retraction, and a subsequent predetermined protraction. This sequence of belt manipulation automatically initiates the tension-relieving mode and automatically resumes the tensioned mode upon subsequent protraction.

The second patent is issued to Robert Fisher, U.S. Pat. No. 4,002,311 issued Jan. 11, 1977, and teaches another form of automatic tension-relieving mechanism that includes memory by utilizing a pawl engagable with a disk attached to the retractor spool and having multiple groove tracks. Upon substantial protraction followed by retraction a pawl is engaged in a multiple track arrangement whereby subsequent protraction will cause said pawl to engage and be retained by multiple ratchet teeth corresponding with desireable amounts of belt slack and preventing subsequent retraction of the belt beyond said engagement. Said tracks are further provided to be spiral grooves that allow a significant amount of belt protraction without the pawl becoming disengaged from said groove such that upon retraction the pawl will retrace its outwardly spiraling path and become re-engaged with said ratchet teeth at substantially the same amount of protractive slack, thus having memory. This mechanism provides for automatic disengagement upon a maximum predetermined protraction of the belt whereby said pawl tracks beyond the outward end of the spiral groove causing said pawl to be disengaged from the groove and snapped back to an initial radially inward position.

One obstacle in the present art of designing seat belt retractors is the friction imparted by the various moving parts. The increased friction of the always engaged tension-relieving mechanisms, such as those disclosed above, requires the use of larger retractor springs in order to overcome that friction. The increased number of frictional surfaces associated with these always engaged and automatically operable systems present formidable engineering design problems and sometimes less than expected service in that the total frictional drag that the retracting spring must overcome is less accurately predictable in systems having greater numbers of parts that are rotated by the spool. The frictional surfaces may impart greater or lesser resistance to rotation of the spool due to a number of factors including irregularities in the frictional surfaces, the degree of lubrication, and wear. The result is that each additional frictional surface within a retractor design increases the range of experienced friction levels in manufactured retractors.

If the amount of friction is underestimated, the specified magnitude of retracting force to be imparted by the retractor spring becomes insufficient to adequately retract the belt. This may result in excess slack in the belt causing it to be improperly positioned to be capable of providing emergency restraint. This may also cause occasional annoying failures of the belt to retract after occupant entrance, exit, or adjustment of the belt system. On the other side, if the total system friction level is over estimated by either compounding of individual design errors or the unpredictability of lubricant effectiveness or surface interaction, an overly large retractor spring may be specified which would be both costly and may impart excessive and discomforting tension forces to the vehicle occupant.

While the various apparatus disclosed in said patents work well for their intended purposes in many applications, there are some instances, particularly for passive seat belt systems, where a tension-relieving mechanism that is manually operable as well as relatively frictionless when in the disengaged condition is highly desireable. To my knowledge no means has previously been available for providing selectively frictionless operation of a retractor while having the capability of operating in a tensionless mode.

SUMMARY OF THE INVENTION

It is therefore a primary object of the present invention to disclose and provide a manually operable tension-relieving mechanism for use with safety belt retractors that selectively relieves the forces imparted by retracting tension of a safety belt.

It is a further object of the present invention to disclose and provide a selectively operable tension-relieving mechanism that imparts minimal drag to a safety belt retracting spool when said mechanism is not in an operable or tension-relieving condition.

It is also an object of the present invention to minimize the range of friction levels experienced in retractor systems by minimizing the number of frictional surfaces when the tension-relieving mechanism is not in use by making the friction producing parts associated with tension-relieving means nominally disengaged and selectively engageable.

Generally stated, the present invention is an improved tension-relieving mechanism for use with a safety belt retractor system.

The present invention is particularly suited for use with a passive inertially operated system and may be applicable to either single or dual belt retractor systems, said dual belt systems having both a shoulder and a lap belt portion. The invention may also be used in conjunction with other seat belt system improvements such as lock-up inhibitors and emergency belt releases.

Simply stated, the present invention includes engaging means which allows the tension-relieving mechanism to be totally disengaged from the retractor spool allowing rotation thereof without any friction imparted by the disengaged tension-relieving mechanism. The invention provides actuator means which is easily manipulable by the vehicle occupant for causing the tension-relieving mechanism to become engaged and operable to the tension-relieving mode whenever the occupant so desires. Tension-relieving means are provided to relieve tension upon a predetermined belt protraction following engagement. Memory means causes repeated operation of the tension-relieving means at that predetermined amount of belt protraction. Disengaging means disengage the mechanism upon either manual operation of the actuator means or protraction of the belt in excess of a predetermined maximum amount. Orienting means restore the mechanism to its initial condition upon disengagement.

More specifically, the improved mechanism is engageable with the retractor spool by a pair of mutually engaging ratchet disks. The first of these disks is fixedly mounted to the retractor spool shaft and the second is carried by an extended length portion of that shaft such that it is laterally slidable along said shaft into and out of engagement with the first disk and rotatable relative thereto. An orienting spring is provided for biasing the second ratchet disk to engagement with the first ratchet disk as well as rotationally re-orienting the second ratchet disk into the predetermined initial condition upon disengagement from the first ratchet disk. Disengagement is accomplished by a lifting plate that interacts with a collar and sleeve portion of the second ratchet disk to lift it out of engagement. Integral with said second ratchet disk is a memory disk having an outwardly spiralling groove that interacts with a tension-relieving pawl and an orienting pawl. The tension-relieving pawl is biased to track the radially inward wall of said groove and is engageable with multiple tension-relieving teeth carried by said inward wall to prevent retractive rotation of the spool. The tension-relieving pawl is also lifted by the lifting plate such that the pawl springs radially inward against an orienting stop such that the pawl will re-engage the disk groove in a predetermined orientation. A manually operable actuator lever communicates with the lifting plate to cause the mechanism to be engaged and disengaged from the retractor spool. A latch is provided to retain the actuator lever in the engaged condition until either manual override or protraction of the belt beyond a predetermined maximum amount which causes the tension-relieving pawl to cause an extended length disengaging arm of the latch to unlatch the actuator lever. Orienting means are provided to return the tension-relieving mechanism to an initial predetermined condition upon disengagement. An orienting pawl tracks the radially outward wall of the memory disc groove and is engageable by an orienting notch carried by said radially outward wall. Such engagement stops re-orienting rotation of the memory disc due to the orienting spring at a predetermined initial position of rotation.

In use, manual operation of the actuator lever causes the lifting plate to allow the second ratchet disc to engage the first ratchet disc thereby engaging the tension-relieving mechanism with the retractor spool and making the tension-relieving means operable. A subsequent slight protraction of the belt causes the tension-relieving pawl to engage one of the tension-relieving teeth of the memory disc groove producing the tensionless mode.

An additional advantage of the system is that selective manual disengagement is available for relieving a substantial amount of tension of the system and thereby allowing increased retractive force to be available for retracting the seat belt. This increased available force minimizes the likelihood of the belt being hung-up or difficult to retract to the proper restraint providing position. This improved tension-relieving mechanism design therefore allows more precise design of retraction devices by minimizing the accumulation of error tolerances for frictional surfaces as well as reducing the total friction of the retractor system when in its nominal or disengaged condition. The results in reduced costs by use of smaller retractor springs, less detailed design, and less maintanence in that the system is more tolerant of changes in mechanical conditions including the degrees of lubrication and wear.

A more complete understanding of the selectively manually operable tension-relieving mechanism with memory in accordance with the present invention as well as recognition of additional objects and advantages thereof, will be afforded to those skilled in the art from a consideration of the following drawings and detailed description of a preferred exemplary embodiment of the invention.

DETAILED DESCRIPTION OF A PREFERRED EMBODIMENT

FIGS. 1 thru 11 illustrate an exemplary embodiment of a vehicle safety seat belt system utilizing a selective manually engageable tension-relieving mechanism with memory. Within the environment of an automotive vehicle 10 shown in FIG. 1, a seat belt system 11 is provided for restraining the movement of a vehicle occupant 12 in an emergency. Conventional systems include a seat belt 13 mounted within the vehicle 10 by first 14 and second 15 anchor means such that the belt 13 passes over the torso of a vehicle occupant 12 in such manner as to be able to provide said emergency restraint.

Figure 1:
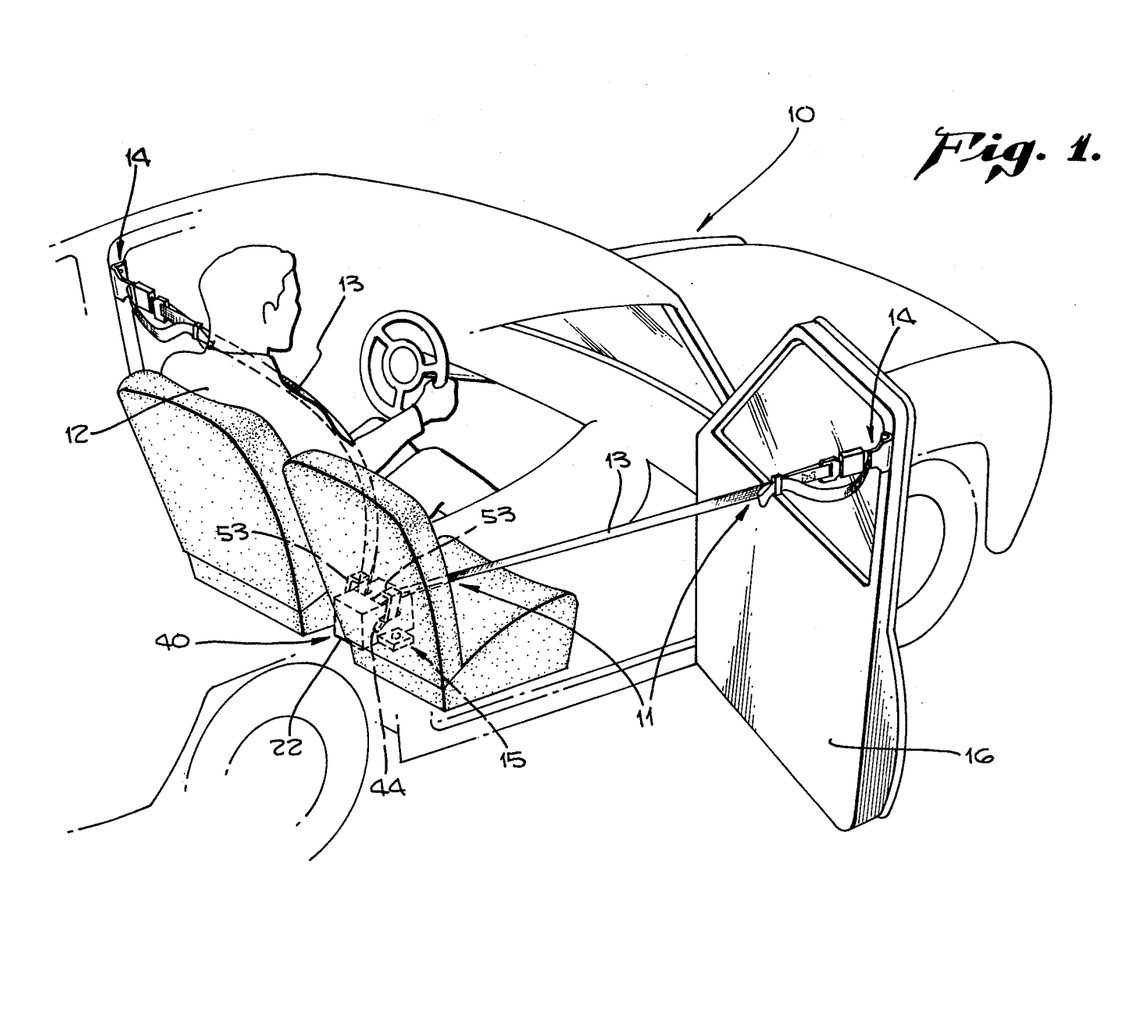
FIG. 1 is a perspective view of a seat belt system and associated retractor means within the environment of a vehicle and including the improved tension-relieving mechanism.

For simplicity, the subsequent description shall be in reference to a single belt portion, shown in FIG. 1 as shoulder belt 13, even though it is specifically contemplated that the disclosed mechanism be compatible with systems having dual belt portion construction whereby one belt portion passes across the upper torso and is known as a shoulder belt and the second belt portion passes across the lower torso and is known as a lap belt. The disclosed mechanism is applicable to either or both belt portions.

As shown in FIG. 1, it is sometimes convenient to position one of said anchor means 14 and 15 of a seat belt system 11 upon the vehicle door 16. This construction permits the use of a must-be-worn seat belt system as opening of the door 16 causes the belt to be moved out of the way of the vehicle occupant to facilitate entering and exiting the vehicle.

Included between said first 14 and second 15 anchor means is retractor means for automatically adjusting the protracted length of the seat belt as well as locking the belt during an emergency condition.

Figure 7:
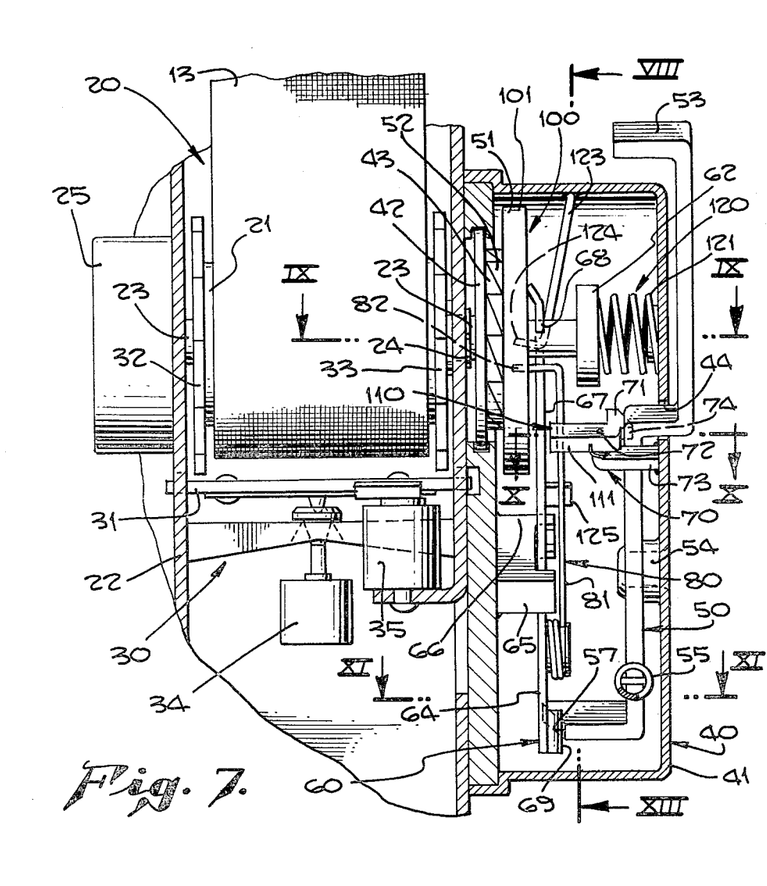
FIG. 7 is a cut-away end elevation of the tension-relieving mechanism of FIG. 2, said mechanism shown in an engaged condition.
Figure 8:
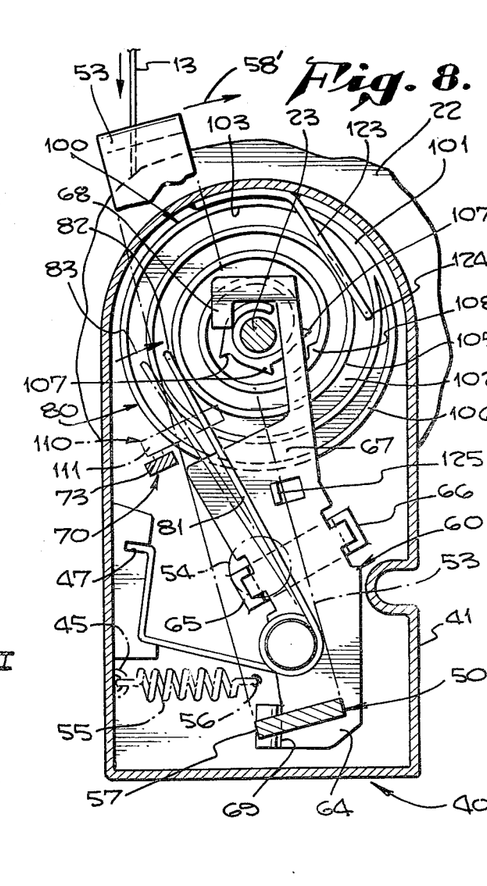
FIG. 8 is an end view of the mechanism of FIG. 7 taken in section along line VIII—VIII of FIG. 7.

Said retractor means is referred to as seat belt retractor 20, shown in FIG. 7, and typically includes a retractor spool 21 for windably retracting belt 13. Said spool 21 is rotatably journaled within a retractor housing 22 by fixedly mounting said spool upon a retracting spool shaft 23 having journal surfaces 24 that cooperate with said housing 22 to allow rotation of said retractor spool 21. A retractor spool biasing spring 25 is provided for biasing said spool 21 to windably retract the seat belt 13. Retractor spring 25 imparts a predetermined amount of tension to the seat belt 13 for eliminating slack in the belt and therby maintaining the belt in a proper position across the torso of a vehicle occupant 12 for providing restraint in an emergency.

Spool associated emergency locking means 30 is provided for causing lock-up of retractor spool 21 in an emergency preventing protraction of seat belt 13 and restraining occupant 12. In the exemplary embodiment said emergency locking means 30 comprises a bar shaped pawl 31 pivotally mounted between sidewalls of said housing 22 and engageable with spool ratchet teeth 32 and 33 in response to tipping of an inertial mass 34. A sudden acceleration or deceleration exceeding a predetermined magnitude causes inertial mass 34 to tip thereby causing pawl 31 to engage spool ratchet teeth 32 and 33 thereby preventing protraction of the seat belt 13 which in turn restrains the vehicle occupant 12.

The locking means 30 may also include a lock-up inhibitor 35 that operates to inhibit motion of the pawl 31 into engagement with spool ratchet teeth 32 and 33 during certain predetermined conditions such as when the vehicle door 16 is open.

Within this described environment of an improved tension-relieving mechanism, a selectively manually engageable tension-relieving mechanism with memory 40 is provided. Said tension-relieving mechanism 40 is selectively manually engageable with said retractor 20 for inhibiting retractive rotation of retractor spool 21 and thereby eliminating discomforting forces from tension of the seat belt 13 against the occupant 12 imparted by retractor spring 25. In the preferred embodiment, shown in an initial disengaged condition in FIGS. 2 through 6 and in an engaged condition in FIGS. 7 through 11, said tension-relieving mechanism 40 comprises a manually operable actuator means or, alternatively, a manual engagement means 50, tension-relieving means 80, memory means 100, disengaging means 110, and orienting means 120, as will hereinafter be described. The tension-relieving mechanism 40 is mounted within mechanism housing 41. Said retractor spool 21 is provided with the previously mentioned shaft 23 having an elongated length. A first ratchet disk 42 having ratchet teeth 43 fixed thereon is mounted upon shaft 23 such that the shaft extends therethrough to carry a second ratchet disk 51 having ratchet teeth 52 engageable with ratchet teeth 43 of said first ratchet disk 42 as will be further described.

Figure 2:
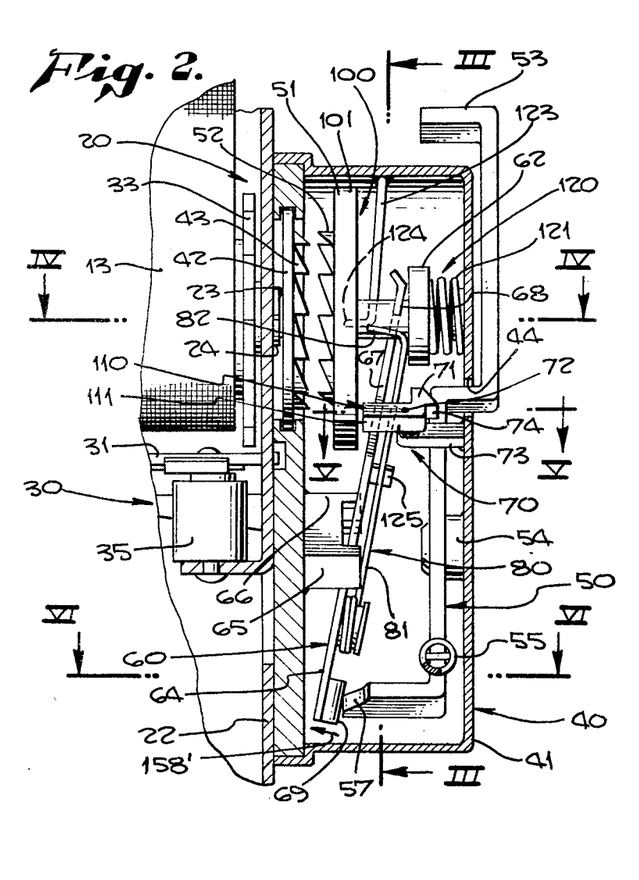
FIG. 2 is a cut-away end elevation of a seat belt retractor including the tension-relieving mechanism of FIG. 1, said mechanism is shown in an initial disengaged condition.
Figure 3:
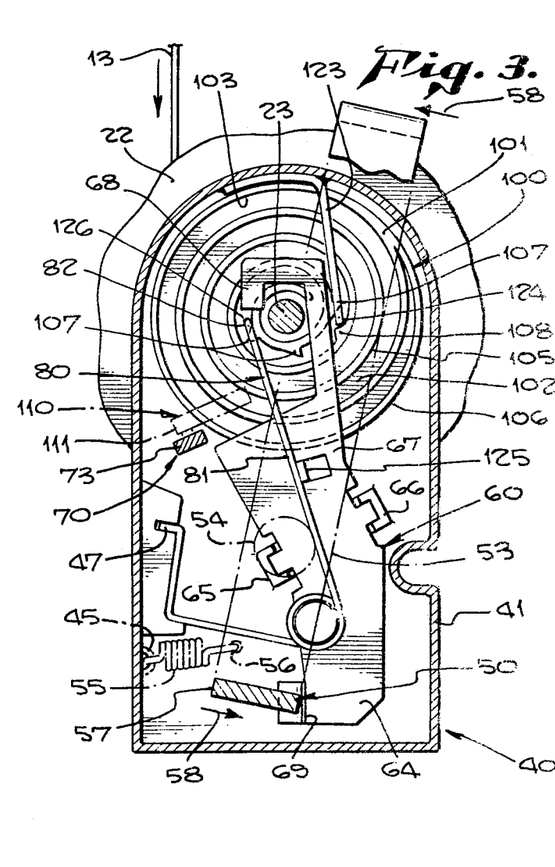
FIG. 3 is an end view of the mechanism of FIG. 2 taken in section along line III—III of FIG. 2.

Tension-relieving mechanism 40 includes manually operable actuator means, alternatively referred to as selectively operable manual engagement means 50 that allows selective manual engagement of said mechanism by a vehicle occupant. Until such engagement it is specifically contemplated that the mechanism be disengaged from said spool so as not to impart drag. In the preferred embodiment and particularly shown in FIGS. 2, 3, 7, and 8, said actuator means 50 comprises an actuator lever 53 pivotally mounted to said mechanism housing 41 by pivot 54. Said lever is rotatably movable about pivot 54, in the direction of arrow 58, from a disengaged condition shown particularly in FIG. 3 to an engaged condition shown particularly in FIG. 8. FIGS. 1 and 2 show said actuator lever 53 extending through a slot 44 in mechanism housing 41 such that a vehicle occupant may manipulate said lever. An actuator lever spring 55 is mounted between spring mounting means 56 upon actuator lever 53 and spring mounting means 45 on mechanism housing 41, as particularly shown in FIGS. 3 and 8, for biasing actuator lever 53 toward the disengaged condition.

Figure 5:
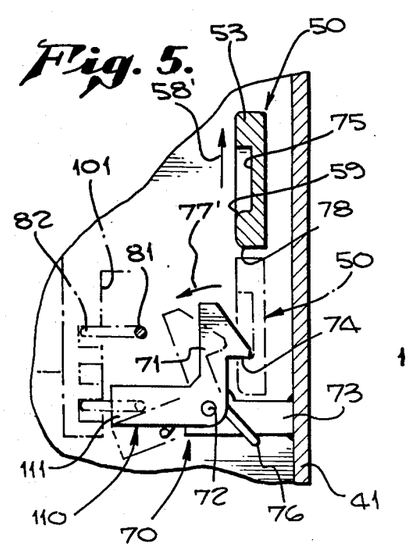
FIG. 5 is an enlarged detailed top view of a first portion of the mechanism of FIG. 2 taken in section along line V—V of FIG. 2.
Figure 10:
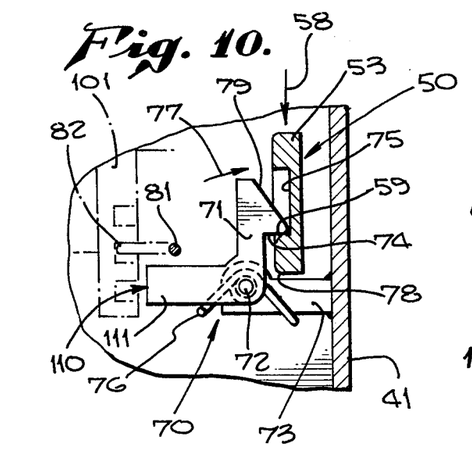
FIG. 10 is an enlarged detailed top view of a first portion of the mechanism of FIG. 7 taken in section along line X—X of FIG. 7.

Said manually operable actuator means, or selectively operable manual engagement means, 50 (referred to as actuator means 50) is further provided with latching means 70 shown in FIGS. 5 and 10 for retaining the actuator lever 53 in an engaged position once said lever has been manipulated by a vehicle occupant to that engaged position. Latching means 70 comprises a latch 71 rotatable about latch pivot 72 carried by latch mounting means 73 integral with retractor housing 41. Said latch 71 has a latch surface 74 that is engageable with a recess 75 of actuator lever 53. Latch spring 76 biases rotational motion of said latch 71 about said latch pivot 72 in the direction shown by arrow 77 of FIG. 5 such that latch surface 74 would engage recess 75 and thereby cause said actuator lever 53 to be retained in the engaged position. More specifically, motion of the actuator lever 53 toward the engaged position in the direction shown by the arrow 58 of FIG. 10 causes leading edge 78 of actuator lever 53 to interact with ramp surface 79 of latch 71 causing said latch to be rotated counterclockwise in opposition to the bias of latch spring 76 to allow said actuator lever 53 to assume the fully engaged position of FIG. 10. Upon attaining said fully engaged position latch 71 is biased by latch spring 76 to rotate clockwise as shown by arrow 77 and move latch surface 74 into latching engagement with recess 75 of actuator lever 53. In this latched condition said actuator lever 53 is inhibited from moving in an upwardly direction toward a disengaged position in response to the biasing force exerted by actuator lever spring 55.

It is further contemplated that the tension-relieving mechanism may be manually disengaged by a vehicle occupant by manipulation of said actuator lever from the engaged to the disengaged position in the direction shown by arrow 58' of FIG. 5. To accomplish this the latching means 70 of the preferred embodiment is further provided with rounded surfaces 59 upon latch surface 74 and the leading edge of recess 75 of actuator lever 53. FIG. 5 shows that for the actuator lever 53 in an engaged position that significant force by the vehicle occupant in the disengaging direction, in the direction of arrow 58', allows the interaction of rounded surfaces 59 to exceed the biasing force of latch spring 76 retaining said latch in the latched condition, said interaction resulting in the rotation of latch 71 in the counter-clockwise direction, and thereby permitting the release and motion of actuator lever 53. This causes motion of cam follower 69 relative cam surface 57 in the direction shown by arrow 58' of FIG. 6 to cause lifting means 60 to disengage the tension-relieving mechanism 40 as will be described later.

Tension-relieving means 80 is made operable by manual operation of said actuator means 50 and is operated by a predetermined protractive angular displacement of said retractor spool 21. Said tension-relieving means 80 includes second ratchet disk 51 and ratchet teeth 52, as previously provided, carried by extended length shaft 23 of retractor spool 21. Said second ratchet disk 51 is both laterally translatable along said shaft 23 and rotatable relative thereto. Said ratchet teeth 52 of said second ratchet disk 51 and said ratchet 43 of said first disk 42 attached to said retractor spool 21 are mutually engageable by lateral translation of the ratchet teeth 52 of said second ratchet disk 51 from the disengaged condition of FIGS. 2 and 4 in the direction of arrow 50 into proximal and engaging relation with ratchet teeth 43 of said first ratchet disk 42 shown in FIGS. 7 and 9. Disengagement of tension-relieving mechanism 40 by lateral separation of said first 42 and said second 51 ratchet disks in the direction of arrow 258' of FIG. 4 allows said tension-relieving mechanism 40 to be disengaged from retractor 20 thereby allowing retractor 20 to operate with substantially reduced drag.

Said second ratchet disk 51 is further provided with a sleeve 61 and collar 62 integral with and extending axially from said disk 51 opposite said ratchet teeth 52. Said disk 51, sleeve 61, and collar 62 are axially aligned and are provided with a bore 63 extending therethrough which serves as a journal surface to allow said disk 51, sleeve 61, and collar 62 to be carried by said shaft 23 and both laterally translatable and rotatable relative thereto. An orienting spring 121 extends between the disk collar 62 and the housing 41 by attachment to said collar at 122 and attachment to said housing at 46. Said orienting spring 121 biases said second ratchet disk 51 to laterally translate along shaft 23 in the direction of arrow 258 of FIG. 9 into engaging relationship with first ratchet disk 42.

Lifting means 60 is provided for engaging said collar 62, exceeding the force imparted by orienting spring 121 and lifting, by lateral translation thereof, said second ratchet disk 51 in the direction of arrow 258 out of engaging relation with said first ratchet disk 42, thereby disengaging said tension-relieving mechanism 40 from said retractor 20. Said lifting means 60 comprises a lifting plate 64 pivotally mounted upon plate pivots 65 and 66, having collar engaging portion 68 and cam follower 69 positioned for interacting with previously mentioned cam surface 57 of actuator lever 53. Said cam surface 57 and cam follower 69, shown in detail in FIGS. 6 and 11, cooperate to translate motion of said actuator lever 53 from a disengaged to an engaged position into pivotal motion of said lifting plate from a lifting condition that retains said first 42 and second 51 ratchet disks in a disengaged condition to a non-lifting position that allows second ratchet disk 51 to be translated by orienting spring 121 in the direction of arrow 258 into engaging relation with first ratchet disk 42 thereby engaging said tension-relieving mechanism 40.

Tension-relieving means 80 is provided for inhibiting retractive rotation of the seat belt spool when in an engaged and operating condition. Said means 80 includes memory means 100 in an initial predetermined condition and engaged by manual operation of the actuator means 50 for identifying and mechanically remembering an initial angular position of rotation of spool 21 corresponding with the amount of seat belt protraction at the time of engagement. Said memory means 100 causes said tension-relieving means 80 to relieve tension upon a predetermined protractive angular displacement of said spool 21 from said initial angular position of rotation to prevent retractive rotation of said spool exceeding the amount thereof corresponding to the spool position on said predetermined protractive angular displacement. Said memory means repeatedly operates at said predetermined protractive angular displacement causing said tension-relieving means 80 to relieve tension until disengagement. Upon disengagement said memory means reassumes said predetermined initial condition in response to orienting means 120 as will be later defined.

Figure 4:
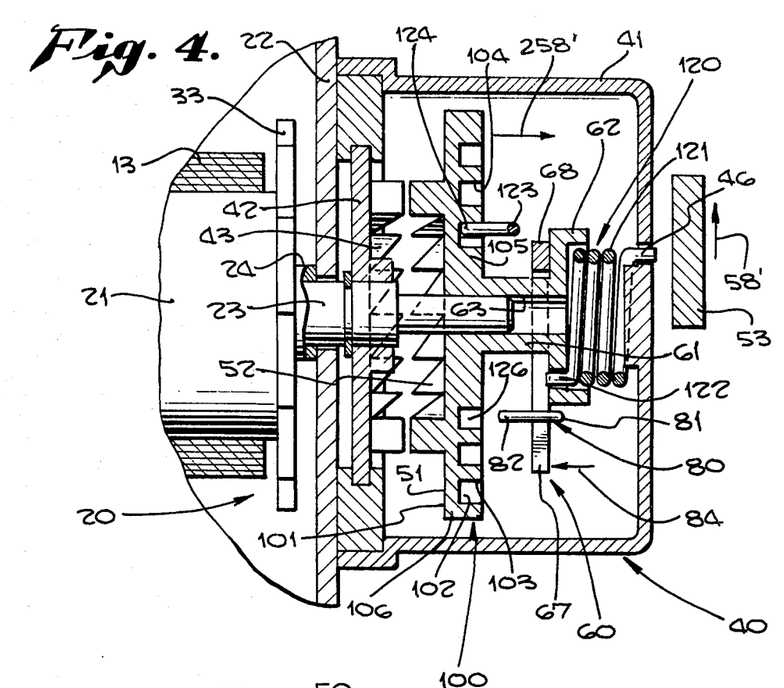
FIG. 4 is an enlarged top view of the mechanism of FIG. 2 taken in section along the line IV—IV of FIG. 2.
Figure 9:
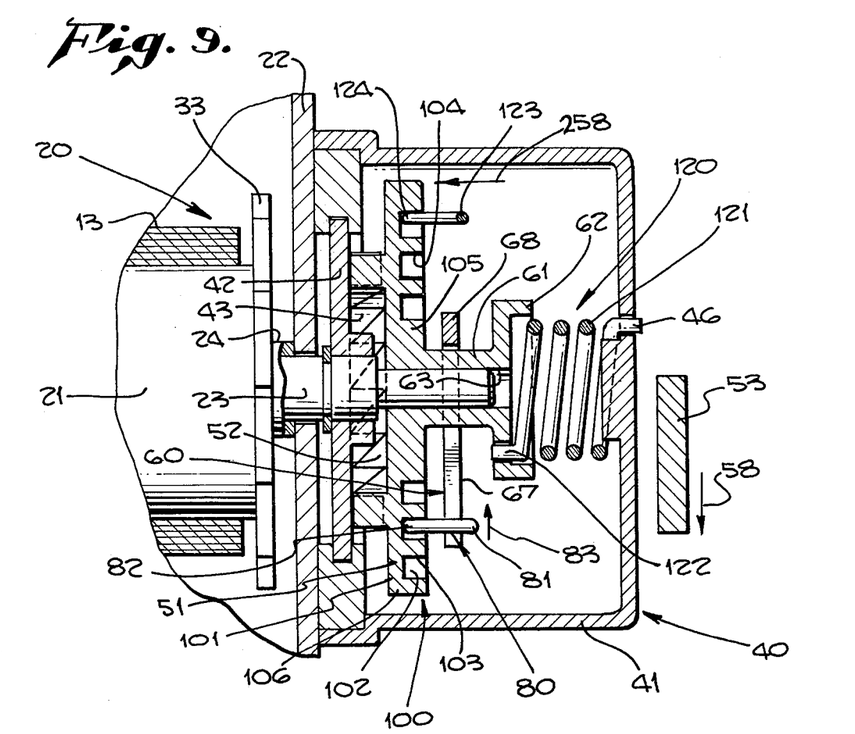
FIG. 9 is an enlarged top view of the mechanism of FIG. 7 taken in section along line IX—IX of FIG. 7.

Referring to FIGS. 4 and 9, in the preferred embodiment said tension-relieving means 80 includes memory means 100 comprised of a memory disc 101 integral with said second ratchet disk 51 and having a radially outwardly spiralling groove 102 on the disk surface opposite said ratchet teeth 52. Said groove has an inner end 103, and outer end 104, a radially inward wall surface 105, and a radially outward wall surface 106. Said radially inward wall 105 is provided with multiple tension-relieving teeth 107 shown in FIG. 3 and said radially outward wall 106 is provided with an orienting tooth 108 which is proximal said inner end 103.

Said tension-relieving means 80 is comprised of a tension-relieving pawl 81 having a groove engaging portion 82 for selectively engaging groove 102 of memory disc 101. Said tension-relieving pawl 81 may be composed of shaped spring wire mounted upon lifting plate 64 and anchored to said mechanism housing 41 with anchoring means 47 such that said tension-relieving pawl is biased both laterally inward to maintain engaging relation with said groove 102 and radially inward of disc 101 such that when engaged in groove 102 said pawl tracks the inward wall 105 of memory disc 101.

Said tension-relieving pawl 81 is in an initially predetermined condition defined by orienting means 120. Upon engagement of said mechanism 40, said tension-relieving pawl 81 drops into groove 102 of memory disk 101 at a predetermined location 126 shown by FIG. 3. Subsequent protractive rotation of retractor spool 21 corresponding with protraction of seat belt 13 causes the tension-relieving pawl 81 to track the radially inward wall 105 of groove 102 toward radially outward positions as shown by the ghosted pawl positions of FIG. 8. During this protractive rotation, the groove engaging portion 82 of the tension-relieving pawl 81 "clicks" over the tension-relieving teeth 107 located on said inward wall 105. Upon subsequent retraction, the tension-relieving mechanism 40 permits retractive rotation of spool 21 until the groove engaging portion 82 of tension-relieving pawl 81 engages one of said tension-relieving teeth 107 thereby preventing further retractive rotation. The engagement of tension-relieving pawl 81 with one of said tension-relieving teeth 107 constitutes the tensionless mode and maintains that measured level of desireable belt slack.

The tension-relieving means 80 is said to have "memory" in that the seat belt 13 may be repeatedly protracted from the tension-relieved position through moderate degrees of protraction and still reassume the tensionless mode of operation whenever the belt is retracted back to the initial tension-relieved position corresponding with re-engagement of said tension-relieving pawl 81 with said tension-relieving teeth 107.

The preferred embodiment is provided with three of said tension-relieving teeth 107 at spaced intervals along said inward wall 105 to provide multiple selectible amounts of desireable seat belt slack when said tension-relieving means 80 is in the tensionless mode of operation whereby a vehicle occupant may protract the belt to one of said three levels of reduced tension and increased slack according to his preference. It is contemplated, however, that the third tension-relieving tooth 107 to be clicked past on protraction after engagement should be positioned so as not to provide so much slack that said belt can no longer be maintained in a proper position for providing restraint in the event of an emergency condition.

Disengaging means 110 are provided for automatically disengaging said tension-relieving mechanism upon protraction of seat belt 13 in excess of a maximum predetermined amount. In the preferred embodiment, said latch 71 of latching means 70 is provided with an extended length disengaging arm 111 such that when said actuator lever 50 is in the engaged and latched condition, said extended length arm extends proximal to and radially inward of the outer end 104 of groove 102 of memory disk 101 such that said extended length arm comes into contact with tension-relieving pawl 81 when said pawl tracks to radially outward positions within said groove 102 corresponding with substantial seat belt protraction. Upon protraction exceeding said maximum amount, tension-relieving pawl 81 contacts extended length disengaging arm 111 of latch 71 as shown in FIG. 5 thereby rotating said latch in an unlatched direction corresponding with a counterclockwise rotation shown by arrow 77', shown ghosted in FIG. 5, causing latch surface 74 to become disengaged from recess 75 and thereby allowing actuator lever 50 to be released and moved in the direction of arrow 58' to the disengaged condition thereby disengaging tension-relieving mechanism 40.

Orienting means are provided for restoring the tension-relieving mechanism to its initial predetermined condition. In the preferred embodiment, initially referring to FIG. 7, orienting means 120 comprises orienting spring 121 attached to collar 62 of second ratchet disk 51 at 122 and to housing 41 at 46. In addition to laterally biasing said second ratchet disk 51 toward engagement with said first ratchet disk, said orienting spring 121 causes said second ratchet disk 51 with memory disk 101 to rotate upon disengagement toward its initial condition. Orienting pawl 123 is also provided for reorienting said memory disk 101. Orienting pawl 123 is fixedly attached to housing 41 and is comprised of spring wire. It is biased both laterally inward to maintain engagement with groove 102 as second ratchet disk translates from the engaged to the disengaged positions and it is biased radially outward of memory disk 101 such that it follows the radially outward wall 106 of groove 102 during rotation. Orienting pawl 123 is engaged by orienting tooth 108 carried by radially outward wall 106 near the inner end of groove 102 to stop reorienting rotation of second ratchet disk 51 in a predetermined manner such that tension-relieving pawl 81 is aligned with groove 102 such that upon re-engagement said pawl will engage said groove at said initial groove engagement location 126 seen in FIGS. 3 and 4.

Lifting plate 64 is further provided with a pawl lifting portion 67 for lifting said pawl 81 out of engagement with said groove 102 concurrent with the lifting of second ratchet disc 51 out of engagement with first ratchet disc 42, previously described. Lifting plate 64 is provided with an orienting stop 125 for stopping the radially inward motion of tension-relieving pawl 81 upon disengagement with radially inward wall 105 of groove 102 in response to the pawl's inherent inward bias. Orienting stop 125 is provided adjacent to pawl lifting portion 67 on lifting plate 64. The orienting stop 125 aligns said tension-relieving pawl 81 to re-engage groove 102 in a predetermined manner at initial groove engagement location 126 shown in FIG. 3.

OPERATION OF THE PREFERRED EMBODIMENT

Tension-relieving mechanism 40 is initially and nominally in a predetermined disengaged condition defined generally by orienting means 120. Second ratchet disk 51 is maintained laterally translated away from first ratchet disk 42 by lifting plate 64 such that ratchet teeth 52 and 43 are disengaged and the mechanism 40 does not impart rotational drag to the retractor spool 21 of retractor 20. Orienting spring 121 maintains memory disk 101 integral with second ratchet disk 51 aligned in a predetermined condition with groove engaging portion 124 of orienting pawl 123 engaging orienting tooth 108 of groove 102. Tension-relieving pawl 81 is biased radially inward against orienting stop 125 such that said pawl 81 is aligned to engage groove 102 in a predetermined manner at initial groove engagement location 126. Actuator lever 53 is biased to maintain the disengaged condition by lever spring 55.

Figure 6:
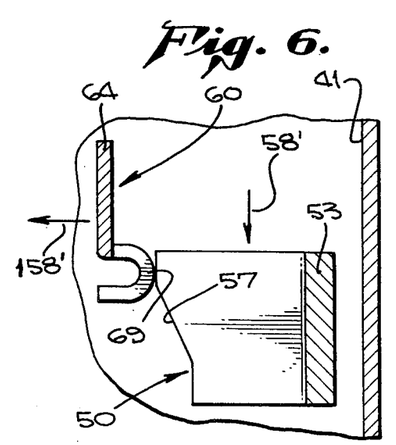
FIG. 6 is an enlarged detailed top view of a second portion of the mechanism of FIG. 2 taken in section along line VI—VI of FIG. 2.
Figure 11:
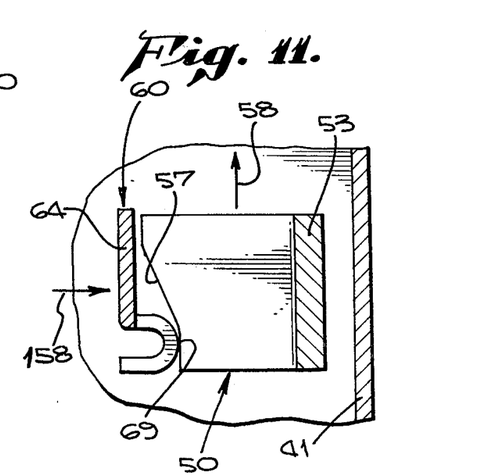
FIG. 11 is an enlarged detailed top view of a second portion of the mechanism of FIG. 7 taken in sectioon along line XI—XI of FIG. 7.

Manual operation of actuator lever 53 from the disengaged to the engaged condition causes cam surface 57 to move relative to cam follower 69 from the relationship of FIG. 6 to the relationship of FIG. 11 thereby translating lever rotation about pivot 54 into lifting plate 64 tilting about plate pivots 65 and 66. Refer generally to the motion from the relationships of FIGS. 2, 3, and 4 to the relationships of FIGS. 7, 8, and 9. Motion of said actuator lever 53 also causes latch 71 to engage lever recess 75 thereby retaining the lever in the engaged position. Tilting of lifting plate 64 allows second ratchet disk 51 to be biased by orienting spring 121 to laterally translate along shaft 23 of retractor spool 21 such that the ratchet teeth 52 of second ratchet disk 51 engage ratchet teeth 43 of first ratchet disk 42 thereby translating rotation of retractor spool 21 in response to seat belt 13 protraction and retraction into rotation of second ratchet disk 51 as well as memory disk 101 and groove 102, integral therewith. Tilting of lifting plate 64 also allows tension-relieving pawl 81 to be lowered into groove 102 of memory disk 101 at a predetermined groove engagement location 126. This allows memory means 100 to identify and mechanically remember the angular position of rotation of spool 21 at the time of engagement and makes the tension-relieving means 80 operable.

Protraction of seat belt 13 subsequent to engagement causes memory disk 101 to rotate with spool 21 and both tension-relieving 81 and orienting 123 pawls to follow groove 102 to more radially outward positions.

Protraction of seat belt 13 of a predetermined angular displacement causes tension-relieving pawl 81 to "click" past the first of the tension-relieving teeth 107 of the radially inward wall 105 of groove 102. The tension-relieving mechanism then allows belt retraction in response to retractor spring 25 only until tension-relieving pawl 81 engages tension-relieving tooth 107 thereby preventing further retraction, the tensionless mode. Tensionless operation will repeatedly occur following subsequent protraction whenever the belt retracts back to the displacement wherein tension-relieving pawl 81 re-engages a tension-relieving tooth 107. This repeated operation made possible by the extended length of the spiral groove through multiple rotations of spool 21 constitutes memory.

Protraction of seat belt 13 in excess of a maximum predetermined amount causes tension-relieving pawl 81 to contact and displace extended length disengaging arm 111 of latch 71. Alternatively, significant manual force on actuator lever 53 in the disengaging position causes the rounded surfaces 59 of latch 71 and recess 75 to also displace latch 71. Displacement of latch 71 allows actuator lever 53 biased by actuator lever spring 55 to return to the disengaged condition. Cam surface 57 and cam follower 69 translate this motion into lifting motion of lifting plate 64. Lifting plate 64 thereby engages collar 62 lifting second ratchet disk 51 out of engagement with first ratchet disk 42, thereby disengaging the tension-relieving mechanism 40. Upon lifting of said second ratchet disk 51, orienting spring 121 biases said disk to rotate until orienting pawl 123 engages orienting tooth 108. Lifting plate 64 also lifts tension-relieving pawl 81 out of engagement with groove 102 of memory disk 101. Upon lifting of said tension-relieving pawl 81 it is biased to spring back to its radially inward initial position as located by orienting stop 125 such that said pawl will be aligned to re-engage said groove 102 at said initial groove engagement location 126.

From the foregoing detailed description it can be seen that a vehicle occupant having a properly positioned seat belt may engage and operate said tension-relieving mechanism 40 into the tensionless mode by merely manually moving the actuator lever 50 to the engaged position and protracting the seat belt 13 to one of three desireable amounts of slackness. Further, either manually moving the actuator lever 50 to the disengaged position or protracting seat belt 13 in excess of said predetermined maximum amount will automatically disengage the tension-relieving mechanism restoring the retractor to a reduced drag condition.

Having thus described a preferred exemplary embodiment of a selectively manually operable tension-relieving mechanism with memory in accordance with the present invention as well as its operation, it should be apparent to those skilled in the art that various alternative embodiments, adaptations, and modifications can be made within the scope and spirit of the present invention which is defined by the following claims.

I claim:

1. In a vehicle seat belt system having a seat belt, means for permanently mounted one end of said seat belt to a first anchor means within the vehicle, and retracting means for retractably mounting the other end of said seat belt to a second anchor means within the vehicle, said first and second anchor means being positioned within said vehicle such that said seat belt passes over the torso of a vehicle occupant to provide restraint in an emergency condition, said retracting means including a rotatably journalled belt retracting spool, a spool biasing spring which causes said spool to windably retract said belt, and emergency locking means to prevent belt protraction during emergency conditions by preventing spool rotation, an improved belt tension-relieving mechanism that is intially in a disengaged condition and is selectively manually engaged to prevent retracting rotation of said spool when said mechanism is in an engaged condition, said mechanism comprising:

a manually operable actuator means for selectively causing said mechanism to be in said engaged condition, a tension-relieving means made operable by manual operation of said actuator means and operated by a predetermined protractive angular displacement of said spool from an initial angular position of rotation of said spool corresponding with the amount of seat belt protraction at the time of engagement, said tension-relieving means operating to prevent subsequent seat belt retraction exceeding said predetermined protractive angular displacement, whereby said tension-relieving means is initially disengaged from said retracting means, selective operation of said manually operable actuator causes said tension-relieving means to be engaged and made operable, and a predetermined subsequent protractive angular displacement of said spool operates said tension-relieving means to prevent seat belt retraction exceeding said predetermined subsequent protractive angular displacement, and disengaging means cooperating with said tension-relieving means for disengaging said tension-relieving means from said retracting means upon a predetermined protractive angular displacement of said spool from said initial angular position of rotation of said spool of more than a predetermined maximum protractive amount thereby restoring said tension-relieving means to said initially disengaged condition.

2. An improved tension-relieving mechanism for use with a vehicle safety seat belt system having a rotatably journalled spool for windably retracting a seat belt and emergency locking means for preventing protraction of said seat belt in an emergency condition, said mechanism comprising:

tension-relieving means engageable with said spool and selectively operable in response to spool rotation imparted by a single protractive belt movement only when engaging said spool to prevent retractive rotation of said spool; and manually operable engagement means for selectively engaging and disengaging said entire tension-relieving means with said spool, said tension-relieving means being operable only when engaging said spool, said manually operable engagement means being operable independent of operation of other vehicle parts 3. The tension-relieving mechanism of claim 2 including the provision of:

memory means having an initial predetermined condition and being made operable by manual operation of said manual engagement means for causing said tension-relieving means to repeatedly operate at a predetermined protractive angular displacement from the initial angular position of rotation of said spool at the time of its engaging said spool.

4. An improved tension-relieving mechanism for use with a vehicle safety seat belt system having a rotatably journalled spool for windably retracting a seat belt and emergency locking means for preventing protraction of said seat belt in an emergency condition, said mechanism comprising:

tension-relieving means selectively operable in response to spool rotation imparted by a single protraction of belt movement to prevent retractive rotation of said spool;

manually operable engagement means for selectively engaging said tension-relieving mechanism with said spool, said tension-relieving means being operable only when engaging said spool, memory means having an initial predetermined condition and being made operable by manual operation of said manual engagement means for causing said tension-relieving means to repeatedly operate at a predetermined protractive angular displacement from the initial angular position of rotation of said spool at the time of its engaging said spool; and disengaging means cooperating with said memory means for automatically disengaging said tension-relieving mechanism from said spool upon a protractive angular displacement of said spool from said initial angular position of rotation of said spool of more than a predetermined maximum protractive amount;

whereby said tension-relieving mechanism is initially disengaging from said retracting spool so as not to impart drag to the rotation of said spool.

5. A tension-relieving mechanism of claim 4 including the provision of:

orienting means for causing said memory means to reassume said initial predetermined condition upon said tension-relieving means disengaging from said spool.

6. The tension-relieving mechanism of claim 5 wherein said retracting spool includes a rotatably journalled retracting spool shaft fixedly attached to said spool and said manually operable engagement means includes:

a first ratchet disk fixedly attached to said shaft, and
a second ratchet disk, in an opposed and engageable relation to said first ratchet disk, attached to said tension-relieving means such that said second ratched disk is rotatable and axially translatable relative to said first ratchet disk for engaging and disengaging said tension-relieving means with said spool.

7. The tension-relieving mechanism of claim 5 wherein:

said memory means comprises a memory disk driven by spool rotation and having a radially outwardly spiraling groove, said groove having an inner end, an outer end, a radially inward wall having at least one tension-relieving tooth, and a radially outward wall having an orienting notch proximal said inner end; and said tension-relieving means comprises a tension-relieving pawl cooperating with said memory disk and said disengaging means, said pawl being biased axially toward said groove of said memory disk and biased radially inward such that whenever said pawl is engaged with said groove said pawl follows said radially inward wall of said groove during rotation of said memory disk, said groove being further defined such that rotation of said memory disk and groove corresponding with protractive rotation of said spool causes said groove to move said pawl radially outward, said pawl being engagable by said tension-relieving tooth only during retractive rotation of said spool, engagement of said tension-relieving pawl with said tension-relieving tooth operating to prevent further retractive rotation of said spool; and lifting means for lifting said pawl out of engagement with said groove when said tension-relieving means disengages with said spool allowing said radially inward bias of said pawl to relocate said pawl at an initial predetermined radially inward position, said lifting means retaining said pawl in said initial predetermined condition until manual engaging operation of said manually engagement means.

8. The tension-relieving mechanism of claim 7 wherein said orienting means comprises:

an orienting pawl cooperating with said memory disk for orienting said memory disk in said initial predetermined condition, said orienting pawl being biased axially toward said groove of said memory disk and biased radially outward such that said orienting pawl is constantly engaged with said groove and follows said radially outward wall of said groove during rotation of said memory disk.

9. The tension-relieving mechanism of claim 8 wherein said orienting means comprises an orienting spring for applying a rotational bias to said memory disk and its groove to cause reorienting rotation thereof toward said initial predetermined condition upon said tension-relieving means disengaging from said spool, said orienting notch defining said initial predetermined condition by defining an initial position of rotation of said memory disk and groove, said orienting pawl engaging said orienting notch upon reorientation to retain said memory means in said initial predetermined condition by limiting rotation of said memory disk until manual operation of said manual engagement means, said lifting means and tension-relieving pawl bias and said orienting means together cooperating to restore said memory means to said initial predetermined condition.

10. The tension-relieving mechanism of claim 9 wherein said manual engagement means includes latching means for retaining said tension-relieving means in an engaged condition upon manual engaging operation of said manual engagement means.

11. The tension-relieving mechanism of claim 10 wherein said disengaging means cooperates with said memory means, said tension-relieving pawl, and said latching means whereby protraction of more than said predetermined maximum protractive amount causes said tension-relieving pawl to follow said groove toward said outer end causing radially outward motion of said pawl in excess of a predetermined amount corresponding with said predetermined maximum protractive amount causing said tension-relieving pawl to unlatch said latching means and thereby causing said tension-relieving mechanism to become disengaged.

12. An improved tension-relieving mechanism for use with a vehicle seat belt system having a rotatably journalled spool for windably retracting a seat belt and emergency locking means for preventing protraction of said seat belt in an emergency condition, said mechanism comprising:
tension-relieving means operable in response to a single spool protractive movement for preventing retractive rotation of said spool;
means for mounting said entire tension-relieving means for movement between spool connected and spool unconnected positions, said tension-relieving means being operable only when in said spool connected position; and
manually operated means for selectively moving said tension-relieving means between said positions.

13. The tension-relieving mechanism of claim 12 including the provision of:
memory means having an initial predetermined condition, engaged by manual operation of said manually operated means and causing said tension-relieving means to repeatedly operate at a predetermined protractive angular displacement from the initial angular position of rotation of said spool at the time of movement of said tension-relieving means to said spool connected position.

14. An improved tension-relieving mechanism for use with a vehicle seat belt system having a rotatably journalled spool for windably retracting a seat belt and emergency locking means for preventing protraction of said seat belt in an emergency condition, said mechanism comprising:
tension-relieving means selectively operable to prevent retractive rotation of said spool,
manual engagement means for selectively engaging said tension-relieving means with said spool thereby causing said tension-relieving means to be made operable, said tension relieving means being operable only when said tension relieving means is in said engaged position,
memory means having an initial predetermined condition, engaged by manual operation of said manual engagement means, and causing said tension-relieving means to repeatedly operate at a predetermined protractive angular displacement from the initial angular position of rotation of said spool at the time of engagement,
disengaging means cooperating with said memory means for disengaging said tension-relieving means from said retracting spool upon a protractive angular displacement of said spool from said initial angular position of rotation of said spool at the time of engagement of more than a predetermined maximum protractive amount, and
orienting means for causing said memory means to reassume said initial predetermined condition upon disengagement,
whereby said tension-relieving means is initially disengaged from said retracting spool so as not to impart drag to the rotation of said spool from said tension-relieving means, selective operation of said manual engagement means causes said tension-relieving means to be engaged with said spool, cause said memory means to be engaged in an initial predetermined condition, and cause said tension-relieving means to be made operable, a predetermined protractive angular displacement of said spool from the initial angular position of rotation of said spool at the time of engagement corresponding with a predetermined protraction of said seat belt causing said memory means to operate said tension-relieving means thereby preventing retractive angular displacement exceeding the amount thereof corresponding with said predetermined protractive angular displacement.

15. The tension-relieving mechanism of claim 14 including means in communication with said manual engagement means for operably connecting said spool to said tension-relieving means upon operation of said manual engagement means, said means operating to communicate protractive rotation of said spool to said memory means and further operating to prevent retractive rotation of said spool upon operation of said tension-relieving means.

16. The tension-relieving mechanism of claim 14 wherein:
said spool includes a rotatably journalled retracting spool shaft fixedly attached to said spool, and
a first ratchet disk fixedly attached to said shaft; and
said tension-relieving means includes a second ratchet disk in an opposed and engageable relation to said first ratchet disk, fixedly attached to said memory means, and mounted upon said shaft such that said second ratchet disk is rotatable and axially translatable relative to said shaft, said axial translation being into and out of engaging relation with said first ratchet disk,
an orienting spring associated with said orienting means for biasing said second ratchet disk into engaging relation with said first ratchet disk, and
lifting means in communication with said manual engagement means for lifting said second ratchet disk out of engaging relation with said first ratchet disk by axially translating said second ratchet disk away from said first ratchet disk upon disengagement of said tension-relieving means and retaining said second ratchet disk out of said engaging relation until manual engaging operation of said manual engagement means.

17. The tension-relieving mechanism of claim 16 wherein:
said memory means comprises a memory disk integral with said second ratchet disk and having a radially outwardly spiraling groove, said groove having an inner end, an outer end, a radially inward wall having at least one tension-relieving tooth, and a radially outward wall having an orienting notch proximal said inner end;
said tension-relieving means comprises a tension-relieving pawl cooperating with said memory disk, said lifting means, and said disengaging means, said pawl being biased axially toward said groove of said memory disk and biased radially inward such that whenever said pawl is engaged with said groove said pawl follows said radially inward wall of said groove during rotation of said memory disk, said groove being further defined such that rotation of said memory disk and groove corresponding with protractive rotation of said spool causes said groove to move said pawl radially outward, said pawl being engagable by said tension-relieving tooth only during retractive rotation of said spool, engagement of said tension-relieving pawl with said tension-relieving tooth operates to prevent further retractive rotation of said spool, said lifting means is also operable upon disengagement of said tension-relieving means to lift said pawl out of engagement with said groove allowing said radially inward bias of said pawl to relocate said pawl at an initial predetermined radially inward position, said lifting means retaining said pawl in said initial predetermined condition until manual operation of said manual engagement means; and
said orienting means comprises an orienting pawl cooperating with said memory disk and said orienting spring for orienting said memory disk in said initial predetermined condition, said orienting pawl being biased axially toward said groove of said memory disk and biased radially outward such that said orienting pawl is constantly engaged with said groove and follows said radially outward wall of said groove during rotation of said memory disk, said orienting spring being further defined to rotationally bias said memory disk and groove to cause reorienting rotation thereof toward said initial predetermined condition upon disengagement, said orienting notch defining said initial predetermined condition by defining an initial position of rotation of said memory disk and groove, said orienting pawl engaging said orienting notch upon reorientation to retain said memory means in said initial predetermined condition by limiting rotation of said memory disk until manual operation of said manual engagement means, said lifting means and tension-relieving pawl bias and said orienting means together cooperating to restore said memory means to said initial predetermined condition upon disengagement.

18. The tension-relieving mechanism of claim 17 wherein said manual engagement means includes latching means whereby upon manual operation of said manual engagement means said latching means retains said tension-relieving means in said engaged condition.

19. The tension-relieving mechanism of claim 18 wherein said disengaging means cooperates with said memory means, said tension-relieving pawl, and said latching means whereby protraction of more than said predetermined maximum protractive amount causes said tension-relieving pawl to follow said groove toward said outer end causing radially outward motion of said pawl in excess of a predetermined amount corresponding with said predetermined maximum protractive amount causing said tension-relieving pawl to unlatch said latching means and thereby causing said tension-relieving means to become disengaged.

20. The tension-relieving mechanism of claim 14 wherein said manual engagement means is operable to disengage said tension-relieving means whereby said tension-relieving means may also be selectively manually disengaged from said spool.

21. In a vehicle seat belt system having a seat belt, means for permanently mounting one end of said seat belt to a first anchor means within the vehicle, and retracting means for retractably mounting the other end of said seat belt to a second anchor means within the vehicle, said first and second anchor means being positioned within said vehicle such that said seat belt passes over the torso of a vehicle occupant to provide restraint in an emergency condition, said retracting means including a rotatably journalled belt retracting spool, a spool biasing spring which causes said spool to windably retract said belt, and emergency locking means to prevent belt protraction during emergency conditions by preventing spool rotation, an improved belt tension-relieving mechanism that is initially in a disengaged condition and is selectively manually engaged to prevent retracting rotation of said spool when said mechanism is in an engaged condition, said mechanism comprising:
an actuator means for selectively causing said mechanism to be in said engaged condition, said actuator means being selectively manually operable independent of said retracting spool;
tension-relieving means made operable by manual operation of said actuator means and operated by a predetermined protractive angular displacement of said spool from an initial angular position of rotation of said spool corresponding with the amount of seat belt protraction at the time of engagement, said tension-relieving means operating to prevent subsequent seat belt retraction exceeding said predetermined protractive angular displacement;
a memory disk rotating with said spool and having a radially outwardly spiraling groove, said groove having an inner end, an outer end, a radially inward wall, a radially outward wall, and at least one tension-relieving tooth on one of said walls, said groove extending a greater distance than one spool revolution between one end of the groove and the tooth nearest said end; and
a tension-relieving pawl cooperating with said memory disk and manually operable actuator means, said pawl being moveable inward into said groove in response to operation of said manually operable actuator means, and means biasing said pawl against said one groove wall during rotation of the memory disk; rotation of the memory disk and groove corresponding with protractive rotation of the spool causing the groove to move the pawl toward said one groove end, said pawl being engageable by said tension-relieving tooth only during retractive rotation of said spool, engagement of said pawl with said tooth operating to prevent further retractive rotation of said spool, whereby said memory disk and pawl provide effective tension-relief for protractions of greater than one spool revolution beyond said tooth nearest said groove end, while permitting the spool to retract as far as said tooth;

whereby said tension-relieving means is initially disengaged from said retracting means, selective operation of said manually operable actuator causes said tension-relieving means to be engaged and made operable, and a predetermined subsequent protractive angular displacement of said spool operates said tension-relieving means to prevent seat belt retraction exceeding said predetermined subsequent protractive angular displacement.

22. An improved tension-relieving mechanism for use with a vehicle safety seat belt system having a rotatably journalled spool for windably retracting a seat belt and emergency locking means for preventing protraction of said seat belt in an emergency condition, said mechanism comprising:

tension-relieving means selectively operable in response to spool rotation imparted by a single protractive belt movement to prevent retractive rotation of said spool;

manually operable engagement means for selectively engaging said tension-relieving means with said spool, said tension-relieving means being operable only when engaging said spool;

a memory disk rotating with said spool and having a radially outwardly spiraling groove, said groove having an inner end, an outer end, a radially inward wall, a radially outward wall, and at least one tension-relieving tooth on one of said walls, said groove extending a greater distance than one spool revolution between one end of the groove and the tooth nearest said end; and a tension-relieving pawl cooperating with said memory disk and manually operable engagement means, said pawl being moveable inward into said groove in response to operation of said manually operable engagement means, and means biasing said pawl against said one groove wall during rotation of the memory disk; rotation of the memory disk and groove corresponding with protractive rotation of the spool causing the groove to move the pawl toward said one groove end, said pawl being engageable by said tension-relieving tooth only during retractive rotation of said spool, engagement of said pawl with said tooth operating to prevent further retractive rotation of said spool, whereby said memory disk and pawl provide effective tension-relief for protractions of greater than one spool revolution beyond said tooth nearest said groove end, while permitting the spool to retract as far as said tooth;

whereby said tension-relieving means is initially disengaged from said retracting spool so as not to impart drag to the rotation of said spool.

23. An improved tension-relieving mechanism for use with a vehicle seat belt system having a rotatably journalled spool for windably retracting a seat belt and emergency locking means for preventing protraction of said seat belt in an emergency condition, said mechanism comprising:

tension-relieving means operable in response to a single spool protractive movement for preventing retractive rotation of said spool;

means for mounting said tension-relieving means for movement between spool connected and spool unconnected positions, said tension-relieving means being operable only when in said spool connected position;

manually operated means for selectively moving said tension-relieving means between said positions;

a memory disk rotating with said spool and having a radially outwardly spiraling groove, said groove having an inner end, an outer end, a radially inward wall, a radially outward wall, and at least one tension-relieving tooth on one of said walls, said groove extending a greater distance than one spool revolution between one end of the groove and the tooth nearest said end; and a tension-relieving pawl cooperating with said memory disk and manually operated means, said pawl being moveable inward into said groove in response to operation of said manually operated means, and means biasing said pawl against said one groove wall during rotation of the memory disk; rotation of the memory disk and groove corresponding with protractive rotation of the spool causing the groove to move the pawl toward said one groove end, said pawl being engageable by said tension-relieving tooth only during retractive rotation of said spool, engagement of said pawl with said tooth operating to prevent further retractive rotation of said spool, whereby said memory disk and pawl provide effective tension-relief for protractions of greater than one spool revolution beyond said tooth nearest said groove end, while permitting the spool to retract as far as said tooth.

* * * * *